R. E. GARDINER.
CULTIVATOR.
APPLICATION FILED MAY 29, 1916.
1,219,720.
Patented Mar. 20, 1917.
2 SHEETS—SHEET 1.
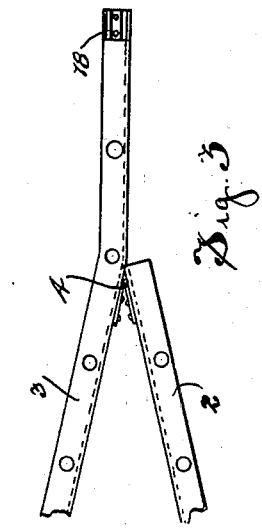
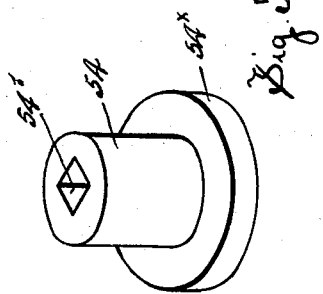
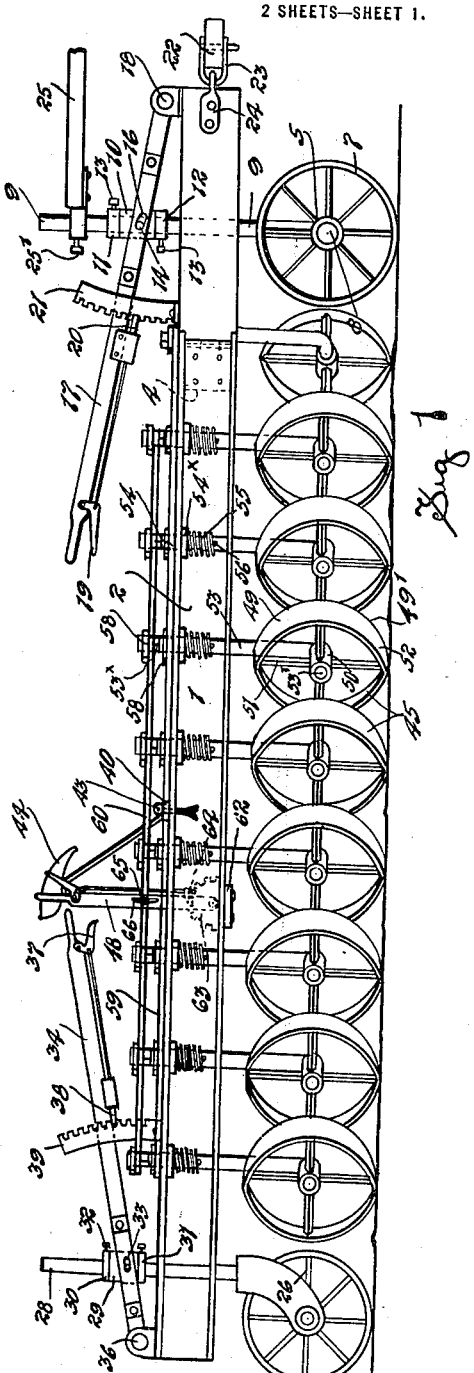
Witnesses
Roland Foster
N. B. Wakefield
By
Inventor
R. E. Gardiner
Attorneys R. E. GARDINER.
CULTIVATOR.
APPLICATION FILED MAY 29, 1916.
1,219,720.
Patented Mar. 20, 1917.
2 SHEETS—SHEET 2.
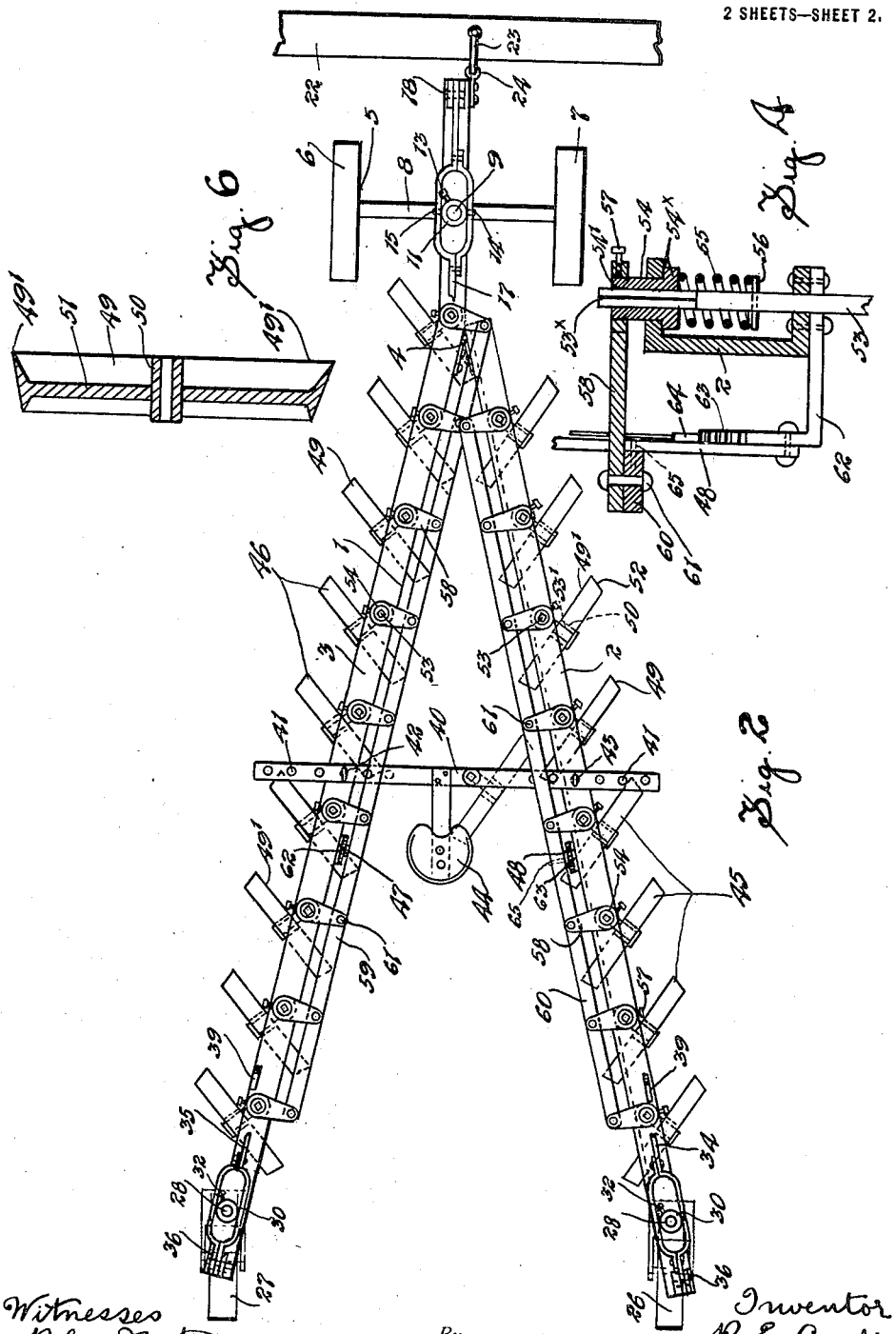
Witnesses
Roland Foster
K. B. Wakefield
Inventor
R. E. Gardiner
By
Attorneys

UNITED STATES PATENT OFFICE.

ROBERT ERNEST GARDINER, OF SPERLING, MANITOBA, CANADA.

CULTIVATOR.

1,219,720.   Specification of Letters Patent.   Patented Mar. 20, 1917.

Application filed May 29, 1916. Serial No. 100,619.

*To all whom it may concern:*

Be it known that I, ROBERT ERNEST GARDINER, of Sperling, in the Province of Manitoba, Canada, have invented certain new and useful Improvements in Cultivators, of which the following is the specification.

The invention relates to improvements in cultivators and particularly to a machine especially designed for eradicating sow thistles and such like weeds, and the object of the invention is to provide a cultivator which when drawn over the land will cut into the soil and destroy the roots of weeds and throw them down on the land where they can be afterward raked up. A further object of the invention is to provide a cultivator which can be adjusted not only as to the depth of the cut but also as to the angle at which the cultivator wheels work, and by such arrangement be enabled to adjust the machine to the various existing conditions which one meets with in the field. A still further object of the invention is while providing a cultivator presenting cutting wheels, to arrange the wheels in such a manner that they can all independently raise in event of striking an obstruction which might damage them.

With the above principal objects in view the invention consists essentially in a main frame presenting adjustable diverging beams, carriage wheels adjustably supporting the frame, a plurality of cultivator cutting wheels provided with shanks mounted in the beams, compression springs associated with the shanks, means connecting the shanks of each beam so that they can be adjusted together to adjust the cultivator wheels and a draft hitch for the machine, the parts being arranged and constructed as hereinafter more particularly described and later pointed out in the appended claims, reference being had to the accompanying drawings in which;

Figure 1 represents a side view of the complete machine.

Fig. 2 is a plan view thereof with the tongue removed.

Fig. 3 is a plan view of the front end of the frame.

Fig. 4 is an enlarged detailed vertical sectional view through one of the beams, showing the manner in which the cultivator wheel shanks are mounted and controlled.

Fig. 5 is a perspective view of one of the sleeves for the shanks.

Fig. 6 represents a vertical sectional view through one of the cultivator cutting wheels.

In the drawings like characters of reference indicate corresponding parts in each figure.

1 represents a main frame formed from a pair of rearwardly diverging beams 2 and 3, which beams are connected together forwardly by an inserted hinge 4. These beams are preferably of channel iron cross section so that they provide top and bottom flanges and the beam 3 is extended forwardly beyond the beam 2 to provide a bearing for the front truck wheels as well as a connection for the hitch.

5 represents a front truck comprising truck wheels 6 and 7 mounted at the ends of a cross axle 8 to which axle I have secured centrally an upstanding spindle 9 which passes slidably through the front or projecting end of the frame.

On the spindle and above the frame I mount slidably an adjusting sleeve 10 inserted between a pair of adjustable collars 11 and 12 fitted with set screws 13. The sleeve is supplied with a pair of outstanding pins 14 and 15 which enter receiving slots 16 provided in the spanning portion of an adjusting lever 17 which passes lengthwise of the machine and has the forward end thereof pivotally connected as indicated at 18 to the front end of the frame. The lever is supplied with a hand latch 19 which controls the detent 20 operating over a quadrant 21 secured permanently to the frame.

From the above arrangement it will be apparent that after one has set the sleeve by adjusting and fastening the collars he can, by manipulating the lever, raise or lower the front end of the frame in respect to the truck wheels.

22 is a draft beam connected by means of a clevis 23 and eye 24 to the front end of the main frame and 25 is a tongue or pole fastened in any suitable way such as by a set screw 25' to the upper end of the spindle 9.

From the above it will be obvious that the tongue will turn the steering wheels regardless of the adjustment given the frame in respect to the truck, as the spindle is actually rotatably mounted in the sleeve 10, being held against end movement therein by the collars.

The rear ends of the beams are supported by similar adjustable caster wheels 26 and 27 which have the spindles 28 thereof passing upwardly slidably through the flanges of the beams and with their upper ends fitted with sleeves 29, collars 30 and 31, set screws 32 and pins 33, identical to those 10, 11 12, 13 and 14. Adjusting levers 34 and 35, similar to that 17, receive the pins 33 and have their rear ends connected pivotally at 36 to the rear ends of the beams and their forward ends supplied with hand latches 37 and detents 38, the detents operating over quadrants 39 located on the beams. This arrangement allows the attendant to adjust the rear ends of the beams in respect to the caster wheels and permits the caster wheels to turn freely when required.

On the beams and more or less centrally thereof I have mounted a cross bar 40 supplied with adjusting openings 41 which are arranged to receive split or similar fastening pins 42 and 43 connecting the bar with the beams. This arrangement allows me to adjust the beams in respect to each other, as after the pins have been withdrawn the rear ends of the beams can be spread or drawn together, turning on the hinge 4. On the bar I have mounted the operator's seat 44.

The beams are equipped with sets of cultivator cutting wheels 45 and 46, each set being directly under the control of an operating lever as indicated at 47 and 48. As all the cultivator wheels are identical in construction and as their mountings in the beams are similar, I will only describe one of them in detail, and in this connection I refer particularly to Fig. 4 of the drawings.

Each cultivator wheel 49 presents a hub 50, spokes 51 and a rim 52, the spokes being preferably square in cross section while the rim tapers, that is to say, it is larger in external diameter at one side than at the other. This feature is best shown in Fig. 6 of the drawings, where it will be observed that the rear side of the rim is of less diameter than the front side. The rim is constructed also so that the larger side thereof presents a cutting edge 49'.

The hub of the wheel, in each instance, is rotatably mounted on a horizontally disposed axle 53' located at the lower end of an upright shank 53, the shank passing through the flanges of the beam and having the upper end thereof squared as indicated at 53×. The upper end of the shank is received slidably within the square center 54' of a receiving sleeve 54 rotatably mounted in the top flange of the beam and having the lower end enlarged as shown at 54× and bearing on the underside of the top flange. A spiral spring 55 is mounted on the shank and engages with the enlarged end of the sleeve and with a cross pin 56 carried by the shank. From this arrangement it will be apparent that the shank can be turned in respect to the beam and that it can slide endwise to allow the wheel to clear over an obstruction.

Each sleeve 54 projects above the top flange of the beam and to the projecting end of the sleeve I have connected such as by means of a set screw 57, an arm 58. All of the arms extend inwardly in the same direction when the wheels of each set are set parallel and the arms of the sets of wheels are connected by connecting bars 59 and 60 pivotally fastened to the arms by pivot pins 61. The connecting bars 59 and 60 are directly under the control of the levers 47 and 48 hereinbefore referred to, which levers have their lower ends pivotally fastened to brackets 62 secured to the beams and supplied with upstanding quadrants 63, the levers being fitted with suitably controlled detents 64 operating on the quadrants.

The levers 47 and 48 are actually connected to the bars 59 and 60 by pins 65 projecting from the bars and entering vertical slots 66 provided in the levers.

The above completes the description of the machine.

When it is to be used the pins 42 and 43 are adjusted to spread or close in the beams according to the work to be done and the draft animals are hitched to the beam 22 and the tongue 25. The operator then adjusts the frame by manipulating the levers 17, 34 and 35 and by so doing places the sets of cultivator wheels to take the proper depth of cut in the ground. He next manipulates and sets the levers 47 and 48 to place the sets of cultivator wheels at the proper angle for cutting purposes and is then ready to proceed with the work of cutting the weeds. As the machine is drawn over the ground it will be obvious that the cultivator wheels will be rotated and will cut their way into the ground, and as the machine is advanced the front edges of said wheels will cut the roots of the weeds and the cut weeds will be caught by the rims of the wheels and thrown down on the ground. Owing to the great variation in adjustment possible in this machine, it is very effective in its work.

If at any time during operations, any one of the wheels strike an obstruction it will not be damaged, as the spindles can move up against the action of the springs to accommodate the obstruction.

What I claim as my invention is;—

1. A cultivator comprising, a frame presenting rearwardly diverging beams, carriage wheels adjustably supporting the frame, a set of rotatably mounted cultivator cutting wheels carried by each beam and disposed at an angle to the direction of draft of the frame and a single means for simultaneously manipulating the cutting wheels of each set to change their angular position in respect to the line of draft.

2. In a cultivator, a frame comprising a pair of rearwardly diverging beams pivotally connected together forwardly and with the forward end of one extending in advance of the other, means for adjustably connecting the diverging ends of the beams, a forward truck adjustably supporting the advanced extremity of the one beam and caster wheels adjustably supporting the rear ends of the beams.

Signed at Carman this 30th day of March 1916.

ROBERT ERNEST GARDINER.

In the presence of—
ALLIE McCLURE,
GEO. O. GOODWIN.

Copies of this patent may be obtained for five cents each, by addressing the "Commissioner of Patents, Washington, D. C."